United States Patent
Lahti et al.

(10) Patent No.: US 7,209,969 B2
(45) Date of Patent: Apr. 24, 2007

(54) SYNCHRONIZATION METHOD

(75) Inventors: Jerry Lahti, Budapest (HU); Tuomas Keränen, Helsinki (FI)

(73) Assignee: Nokia Corporation, Espoo (FI)

( * ) Notice: Subject to any disclaimer, the term of this patent is extended or adjusted under 35 U.S.C. 154(b) by 387 days.

(21) Appl. No.: 10/297,038

(22) PCT Filed: May 28, 2001

(86) PCT No.: PCT/FI01/00508

§ 371 (c)(1),
(2), (4) Date: Jun. 4, 2003

(87) PCT Pub. No.: WO01/93092

PCT Pub. Date: Dec. 6, 2001

(65) Prior Publication Data
US 2004/0015727 A1 Jan. 22, 2004

(30) Foreign Application Priority Data
May 29, 2000 (FI) .................................. 20001281

(51) Int. Cl.
*G06F 15/16* (2006.01)
(52) U.S. Cl. ....................... 709/228; 709/248
(58) Field of Classification Search ................ 709/227, 709/228, 248; 713/201, 202; 345/745
See application file for complete search history.

(56) References Cited
U.S. PATENT DOCUMENTS
5,875,296 A * 2/1999 Shi et al. ..................... 713/202

(Continued)

FOREIGN PATENT DOCUMENTS
EP 0875844 11/1998

(Continued)

OTHER PUBLICATIONS

Netscape "Persistent Client State HTTP Cookies", Retrieved from http://home.netscape.com/newsref/std/cookie_spec.html on Sep. 27, 2004, Copyright 1999.*

(Continued)

*Primary Examiner*—Marc D. Thompson
(74) *Attorney, Agent, or Firm*—Alfred A. Fressola; Ware, Fressola, Van Der Sluys & Adolphson LLP

(57) ABSTRACT

The invention relates to methods for managing state information associated with user agents in systems utilizing the wireless application protocol. According to the invention, the user agent indicates in the header information of a WAP message such as a request to the cookie proxy that the user agent currently has a session having associated state information, when the user agent has received header information indicating the presence of a cookie during the current session. This informs the cookie proxy that it should continue storing the cookies associated with the current session. When the cookie proxy receives for the next time a WAP message without such indication, it can assume that a new session has started, in which case the cookie proxy can discard all cookies bound to the previous session unless certain parameters of certain cookies explicitly indicate that they should not be discarded at that moment. Further, in an advantageous embodiment of the invention, the cookie proxy can indicate to the user agent that it has no cookies associated with the current session. The invention allows the synchronization of the user agent and the cookie proxy.

6 Claims, 1 Drawing Sheet

U.S. PATENT DOCUMENTS

| | | | | |
|---|---|---|---|---|
| 5,961,593 | A * | 10/1999 | Gabber et al. | 709/219 |
| 5,961,601 | A * | 10/1999 | Iyengar | 709/229 |
| 5,963,915 | A * | 10/1999 | Kirsch | 705/26 |
| 6,006,269 | A * | 12/1999 | Phaal | 709/227 |
| 6,085,224 | A * | 7/2000 | Wagner | 709/203 |
| 6,134,592 | A * | 10/2000 | Montulli | 709/229 |
| 6,308,212 | B1 * | 10/2001 | Besaw et al. | 709/228 |
| 6,393,467 | B1 * | 5/2002 | Potvin | 709/217 |
| 6,460,141 | B1 * | 10/2002 | Olden | 713/201 |
| 6,606,708 | B1 * | 8/2003 | Devine et al. | 713/201 |
| 6,711,618 | B1 * | 3/2004 | Danner et al. | 709/228 |
| 6,892,307 | B1 * | 5/2005 | Wood et al. | 713/201 |
| 6,959,420 | B1 * | 10/2005 | Mitchell et al. | 709/224 |

FOREIGN PATENT DOCUMENTS

| | | |
|---|---|---|
| WO | WO9964967 | 12/1999 |

OTHER PUBLICATIONS

Randal L. Schwartz "Programming with Perl, Making a Cookie Jar" Retrieved from http://www.webtechniques.com/archives/1998/12/perl/ on Sep. 27, 2004. Web Techniques, vol. 3, Dec. 1998.*

Kristol et al. "HTTP State Management Mechanism" RFC 2965. Retrieved from http://www.faqs.org/ftp/rfc/pdf/rfc2965.txt.pdf on May 13, 2005.*

Request For Comments 2109, Network Working Group, "*HTTP State Management Mechanism*," by D.Kristol and L. Montulli, Feb. 1997, 15pp.

* cited by examiner

SYNCHRONIZATION METHOD

CROSS REFERENCE TO RELATED APPLICATIONS

This application is for entry into the U.S. national phase under §371 for International Application No. PCT/FI01/00508 having an international filing date of May 28, 2001, and from which priority is claimed under all applicable sections of Title 35 of the United States Code including, but not limited to, Sections 120, 363 and 365(c), and which in turn claims priority under 35 USC §119(e) to Finnish Patent Application No. 20001281 filed on May 29, 2000.

BACKGROUND OF INVENTION

1. Field of the Invention

The invention relates to methods for managing state information associated with user agents in systems utilizing the wireless application protocol. Especially, the invention is related to such a method as specified in the preamble of the independent method claim.

2. Description of Related Art

The following terms and acronyms will be used throughout the application:

WAP Wireless Application Protocol
HTTP Hypertext Transfer Protocol
WML Wireless Markup Language
Client a device or a software application that initiates a request for a connection with a server
Cookie Proxy an intermediate program that acts as a user agent for the purpose of managing cookies and cookie storage on behalf of other user agents
Origin Server the server, on which a given resource resides or is to be created, often referred to as a web server or an HTTP server
Proxy an intermediate program that acts as both a server and a client for the purpose of making requests on behalf of other clients
User a person, who interacts with a user agent to view, hear or otherwise use a resource
User Agent a user agent is any software or device that interprets WML, WMLScript or other content On the World Wide Web, the HTTP State Management mechanism stores state information in a file known as a cookie on the client This mechanism is defined in RFC2109. The same mechanism can also be used over the WAP protocols, since HTTP headers are used to convey all state and state manipulation information. RFC2109 defines a means whereby an origin server can request that a small unit of state information i.e. a cookie is stored in the user agent, and included in subsequent requests to the origin server. A variety of controls are available to the origin server, allowing it to control when the cookie is included in subsequent requests, when the cookie expires as well as other state management and transport controls. According to RFC2109 the user agent is responsible for cookie management.

According to the draft specifications for WAP HTTP state management at the time of writing this patent application, a cookie proxy can be used to store manage cookies on behalf of the user agent. Such an approach is described in the patent application WO 99/64967, for example. The advantage of such an approach is the saving of memory capacity and processing capacity in a mobile communication device, and also to save the resources of the air interface. The cookie proxy is an HTTP proxy or proxy equivalent such as a WAP Gateway that manages cookies on behalf of WAP user agents that do not implement the HTTP state function directly. The cookie proxy is responsible for managing and storing cookies on behalf of the user agents, and modifies HTTP requests and responses to and from the user agent to implement this function. However, the cookie proxy concept has a problem, which has not been solved previously. According to RFC2109, some cookies may be bound to the user agent session. Because of this, there should be a method for the cookie proxy to detect when a new session is activated and cookies bound to the previous session should be discarded. This means that the user agent and the cookie proxy must be somehow synchronized. However, the specification drafts existing at the time of writing of this patent application do not specify any ways to remedy this problem.

SUMMARY OF THE INVENTION

An object of the invention is to realize a method that alleviates the problems of the prior art The objects are reached by arranging an user agent to indicate to the cookie proxy that a cookie associated with the current session has been received by the user agent and/or the cookie proxy.

The method according to the invention is characterized by that, which is specified in the characterizing part of the independent method claim. The network element according to the invention is characterized by that, which is specified in the characterizing part of the independent claim directed to a network element. The mobile communication means according to the invention is characterized by that, which is specified in the characterizing part of the independent claim directed to a mobile communication means. The software program product for a wireless application protocol user agent according to the invention is characterized by that, which is specified in the characterizing part of the independent claim directed to a software program product for a wireless application protocol user agent. The dependent claims describe further advantageous embodiments of the invention.

According to the invention, the user agent indicates in the header information of a WAP message such as a request to the cookie proxy that the user agent currently has a session having associated state information, when the user agent has received header information indicating the presence of a cookie during the current session. This informs the cookie proxy, that it should continue storing the cookies associated with the current session. When the cookie proxy receives for the next time a WAP message without such indication, it can assume that a new session has started, in which case the cookie proxy can discard all cookies bound to the previous session unless certain parameters of certain cookies explicitly indicate that they should not be discarded at that moment Further, in an advantageous embodiment of the invention, the cookie proxy can indicate to the user agent that it has no cookies associated with the current session. The invention allows the syncronization of the user agent and the cookie proxy.

Advantageously, the indication can be implemented by using one of certain values in the X-Wap-Proxy-Cookie-header field. These certain values can be for example 'session-has-state' and 'cache-has-state'. These values make it possible for the user agent to indicate that it has received at least one X-Wap-Proxy-Set-cookie-header during the current user agent session, in which case the user agent believes to have one or more cookies handled by the cookie proxy during a particular browsing session. If cookie proxy then receives the same header with plain values 'session' or 'cache', it should discard all cookies without Max-age attribute that are related to the user agent i.e. the cookies bound to the previous browsing session.

Advantageously, the cookie proxy can give the indication to the user agent that it has no cookies associated with the current session by using a specific value in a specific header field. For example, in an advantageous embodiment of the invention, the cookie proxy gives the indication by presenting the value 'error' in the 'X-WapProxy-Set-Cookie' header field. Preferably, the cookie proxy gives the indication to the user agent in such a case, that the user agent indicates that the current session has associated cookies, but that the cookie proxy does not for any reason have any cookies associated with the session. Such a situation can arise for example if the cookie proxy loses the cookies due to an error. The user agent can then inform the user that inconsistent behaviour may occur.

BRIEF DESCRIPTION OF THE DRAWING

Various embodiments of the invention will be described in detail below, by way of example only, with reference to the accompanying FIG. 1, which illustrates various embodiments of the invention.

DETAILED DESCRIPTION OF THE PREFERRED EMBODIMENTS

Figure 1:
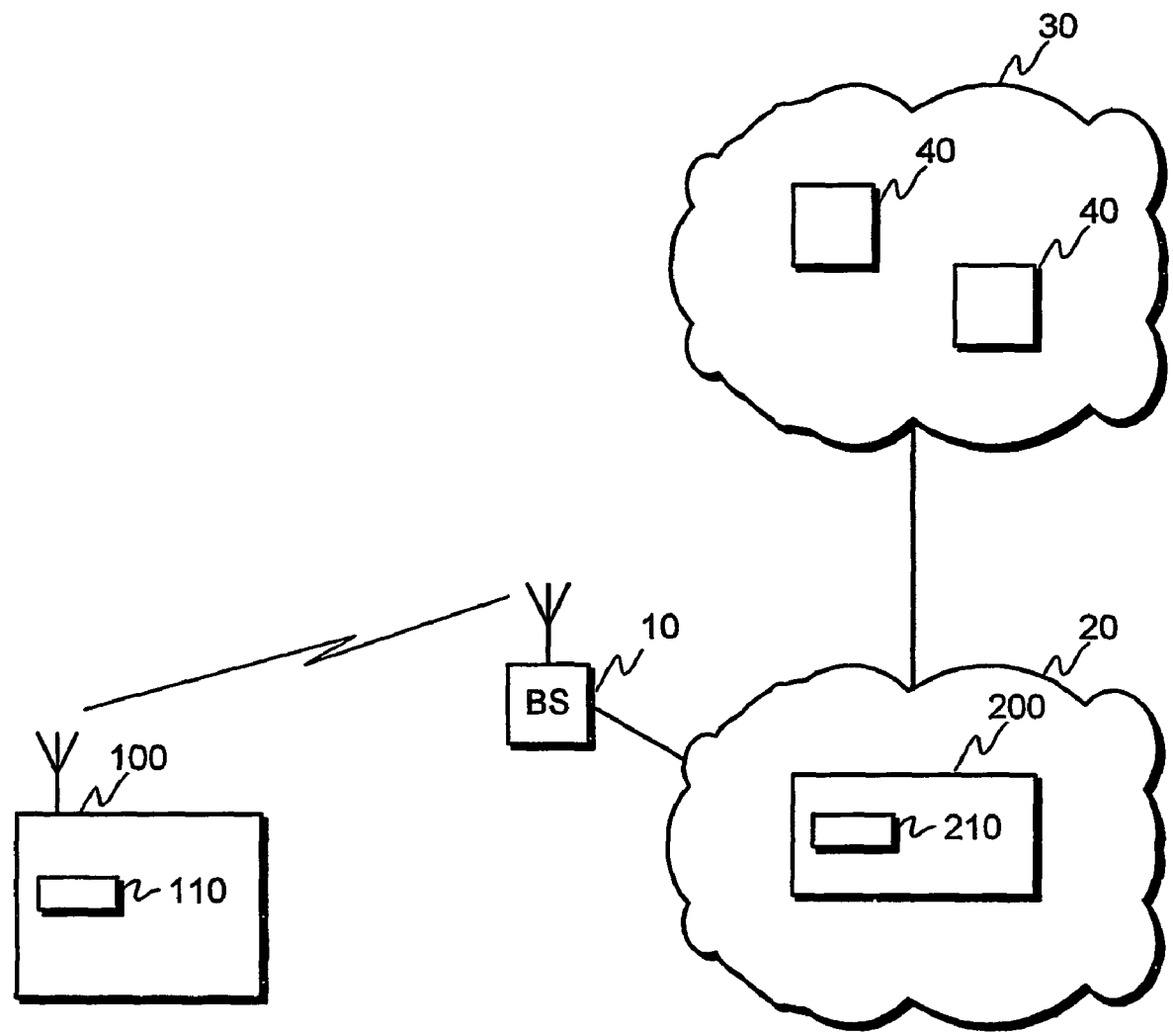

A. Embodiments According to a First Aspect of the Invention

According to a first aspect of the invention, the X-Wap-Proxy-Cookie header is used to transfer the indication of a session having associated cookies from a user agent to a cookie proxy. This header is sent in a WAP message such as a request from the user agent to indicate whether the Cookie Proxy should store cookies from origin servers or not. X-Wap-Proxy-Cookie header is also used to send status information from user agent to the Cookie Proxy.

According to an advantageous embodiment of the invention, the X-Wap-Proxy-Cookie header may have the values of "cache-has-state" and "session-has-state", in addition to previously known values of "cache", "delete", "none", and "session". The meanings of these values according to the present exemplary embodiment are described in the following. When the value is "cache" or "cache-has-state", the Cookie Proxy caches cookies and sends them to the origin server on behalf of the user agent. User agent appends cache-has-state value instead of cache in case it has received at least one X-Wap-Proxy-Set-Cookie header during the ongoing user agent session. This mechanism enables simple method for synchronization between user agents and Cookie Proxy. On account of this information Cookie Proxy can e.g. detect if the user agent session based cookies from the previous usage time should be discarded. When the value is "delete", the Cookie Proxy does not send any cookies to the origin server or store any received cookies. That is, the proxy acts as a filter and deletes all cookies before they are sent to the user agent If the header is not present, or has a value of "none", the proxy passes all HTTP cookie headers through between the user agent and the origin server without interception. When the value is "session", or "session-has-state", Cookie Proxy and user agent functionalities are combined. If Cookie Proxy receives a response containing a Set-Cookie header from the origin server, it decides the place for cookie storage according to the presence of the Max-Age attribute in the Set-Cookie header. This method can be used to separate session-based cookies from long-lived ones. The difference between session and session-has-state values is similar to the difference between cache and cache-has-state values, which is described above. Note that status of the session is bound to the user agent session, which begins when the user agent starts and ends when it exits. Status is preferably not related to a certain cookie-derived session, but it simply tells if the user agent has cookies managed by the Cookie Proxy during a particular user agent session.

According to an advantageous embodiment of the invention, the cookie proxy server uses the X-Wap-Proxy-Set-Cookie header to indicate that it does not have any cookies associated with the current session. This header can be used by the cookie proxy to indicate that one or more cookies were received in a response from an origin server and stored in the cookie proxy and/or at least one cookie was sent in the corresponding request. According to the present exemplary embodiment of the invention, the Cookie Proxy uses X-Wap-Proxy-Set-Cookie header to report an erroneous status to the user agent. In the present exemplary embodiment, the XWap-Proxy-Set-Cookie header can have one of at least these two values: "state" or "error". The meaning of these values are described in the following according to an exemplary embodiment of the invention. When value is "state", the user-agent is able to detect that a stateful session is in progress. Cookie Proxy sends this header value in a message to the user agent when it receives a Set-Cookie header from the origin server and chooses to manage the cookie. This header is also sent when the Cookie Proxy has added a Cookie header in the related HTTP request. When the value is "error", Cookie Proxy has detected a mismatch between the status of the user agent and the Cookie Proxy. Such a situation may arise for example if Cookie Proxy loses the cookies for any reason during a particular user agent session.

B. Embodiments According to a Second Aspect of the Invention

In the following, functionality of a cookie proxy according to preferred embodiments of the invention in certain situations are described.

In an advantageous embodiment of the invention, when Cookie Proxy receives a "X-Wap-Cookie-Proxy: cache" header, it discards all the current user agent session-based cookies, i.e. those cookies which were sent from the origin server without a Max-Age-attribute.

In an advantageous embodiment of the invention, when cookie proxy receives a "X-Wap-Cookie-Proxy: session" or a "X-Wap-Cookie-Proxy: session-has-state" header from an user agent, the cookie proxy includes cookies in the requests to the origin servers. If the Cookie Proxy receives a response containing the Set-Cookie header from the origin server, it decides the place for cookie storage according to the presence of the Max-Age attribute in the Set-Cookie header. If Max-Age attribute is present, the cookie proxy transmits the cookie to the user agent without interception. Otherwise it is stored by the Cookie Proxy until the cookie proxy receives a subsequent "X-Wap-Cookie-Proxy: session" or "X-Wap-Cookie-Proxy: cache" header from the user agent Similarly to "X-Wap-Cookie-Proxy: cache" header, the "X-Wap-Cookie-Proxy: session" header effectively indicates that user agent does not have any cookies bound to the current user agent session and thus all stored cookies without Max-Age attribute must be discarded.

Advantageously the Cookie Proxy does not perform any -cookie management including storage or filtering, without the receipt of an "X-Wap-Proxy-Cookie. cache", "X-Wap-Proxy-Cookie: cache-has-state", "X-Wap-Proxy-Cookie: session", or "X-Wap-Proxy-Cookie: session-has-state" header from the user agent, indicating that cookie management is desired.

Advantageously the Cookie Proxy includes "X-Wap-Proxy-Set-Cookie: state" header in the response to the client, if it has received a cookie in the response from the origin server and chosen to manage it or it has sent a Cookie header in the associated HTTP request Preferably, this header is not sent if neither of the Cookie and Set-Cookie headers was present in the HTTP request and response, or if the cookie proxy has not cached any cookie information. Advantageously, the Cookie Proxy includes "X-Wap-Proxy-Set-Cookie: error" header in the response if user agent sends status information which is conflicting with the status recorded by the Cookie Proxy. That is, if a user agent sends a request with "X-Wap-Proxy-Cookie: cache-has-state" or "X-Wap-Proxy-Cookie: session-has-state" header, but Cookie Proxy does not have any cookies in storage for this particular user agent

C. Embodiments According to a Third Aspect of the Invention

In the following, functionality of a user agent according to preferred embodiments of the invention in certain situations are described.

According to an advantageous embodiment of the invention, a User agent includes WAP Specific HTTP State Management Headers in WAP messages such as requests to utilize Cookie Proxy facilities. Preferably, the user agent comprises means for allowing the user to elect to use either cookie proxy facilities or their own local cookie management or both.

According to an advantageous embodiment of the invention, the user agent sends the "X-Wap-Cookie-Proxy: cache-has-state" header instead of the "X-Wap-Cookie-Proxy: cache" header and correspondingly the "X-Wap-Cookie-Proxy: session-has-state" header instead of the "X-Wap-Cookie-Proxy: session" header in case it has received at least one X-Wap-Proxy-Set-Cookie header during the ongoing user agent session. Preferably, the user agent comprises means for notifying the user that inconsistent service behavior may occur as a response to receiving a "X-WapProxy-Set-Cookie: error" header from the cookie proxy.

D. Embodiments According to Further Aspects of the Invention

In the following, certain aspects of the invention are described.

According to a further aspect of the invention, a method for controlling the handling of cookies by a cookie proxy in a cellular telecommunication system employing the wireless application protocol is provided According to an advantageous embodiment of the invention, the method comprises at least the step of indicating by an user agent to the cookie proxy that the user agent and/or the cookie proxy has received a cookie associated with the current session.

According to a further aspect of the invention, a network element of a cellular telecommunication system employing the wireless application protocol is provided. This aspect is illustrated in FIG. 1. According to an advantageous embodiment of the invention, the network element 200 comprises at least means 210 for controlling storing of cookies, said means for controlling being at least partly controllable by an indication by an user agent to the cookie proxy that the user agent and/or the cookie proxy has received a cookie associated with the current session. FIG. 1 further illustrates a mobile communication means 100, a cellular telecommunication network 20, a base station 10 of the cellular telecommunication network 20, and a second network 30 comprising origin servers 40. The second network 30 can be a public data network such as the internet, or for example an internal network of a cellular service provider providing WAP services for the customers of the provider using servers 40 in the internal network.

According to a further aspect of the invention, a mobile communication means for a cellular telecommunication system employing the wireless application protocol is provided. According to an advantageous embodiment of the invention, the mobile communication means comprises at least means 110 for indicating to a cookie proxy that the mobile communication means and/or the cookie proxy has received a cookie associated with the current session.

According to a further aspect of the invention, a software program product for a wireless application protocol user agent is provided. According to an advantageous embodiment of the invention, the software program product for a wireless application protocol user agent comprises at least computer program code means for indicating to a cookie proxy that the user agent and/or the cookie proxy has received a cookie associated with the current session.

According to a further aspect of the invention, a software program product for a cookie proxy for wireless application protocol user agents is provided. According to an advantageous embodiment of the invention, the software program product for a cookie proxy for wireless application protocol user agents comprises at least computer program code means for controlling storing of cookies, said means for controlling being at least partly controllable by an indication by an user agent to the cookie proxy that the user agent and/or the cookie proxy has received a cookie associated with the current session.

E. Further Considerations

The inventive method allows the WAP HTTP state management to seamlessly fulfill the semantics of RFC2109.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. A method for controlling the handling of cookies by a cookie proxy in a cellular telecommunication system employing the wireless application protocol, characterized in that the method comprises at least the step of indicating by a user agent to the cookie proxy that the user agent, the cookie proxy, or both the user agent and cookie proxy has received a cookie associated with the current session, and that the cookie proxy is informed to continue storing cookies associated with the current session or delete cookies bound to the previous session by an indication in a message, which message if received with said indication informs the cookie proxy to continue the storing of cookies associated with the current session, and which message if received without said indication informs the cookie proxy to delete session-bound cookies of the previous session.

2. A method according to claim 1, wherein the cookies not to be deleted are indicated to the proxy by a parameter of these cookies.

3. A network element of a cellular telecommunication system employing the wireless application protocol, characterized in that the network element comprises at least means for controlling storing of cookies, said means for being at least partly controllable by an indication by a user agent to the cookie proxy that the user agent, the cookie proxy, or both the user agent and cookie proxy has received a cookie associated with the current session, and that said means are arranged so that the cookie proxy is informed to continue storing cookies associated with the current session or delete cookies bound to the previous session by an indication in a message, which message if received with said indication informs the cookie proxy to continue the storing of cookies associated with the current session, and which message if received without said indication informs the cookie proxy to delete session-bound cookies of the previous session.

4. A mobile communication means for a cellular telecommunication system employing the wireless application protocol, characterized in that the mobile communication means comprises at least means for indicating to a cookie proxy that the mobile communication means, the cookie proxy, or the mobile communication means and the cookie proxy has received a cookie associated with the current session, and that said means are arranged so that the cookie proxy is informed to continue storing cookies associated with the current session or delete cookies bound to the previous session by an indication in a message, which message if received with said indication informs the cookie proxy to continue the storing of cookies associated with the current session, and which message if received without said indication informs the cookie proxy to delete session-bound cookies of the previous session.

5. A software program product stored on a computer readable medium for a wireless application protocol user agent, characterized in that it comprises at least computer program code means for indicating to a cookie proxy that the user agent, the cookie proxy, or both the user agent and the cookie proxy has received a cookie associated with the current session, and that said computer program code means are arranged so that the cookie proxy is informed to continue storing cookies associated with the current session or delete cookies bound to the previous session by an indication in a message, which message if received with said indication informs the cookie proxy to continue the storing of cookies associated with the current session, and which message if received without said indication informs the cookie proxy to delete session-bound cookies of the previous session.

6. A software program product stored on a computer readable medium for a cookie proxy for wireless application protocol user agents, characterized in that it comprises at least computer program code means for controlling storing of cookies, said means for controlling being at least partly controllable by an indication by a user agent to the cookie proxy that the user agent, the cookie proxy, or both the user agent and the cookie proxy has received a cookie associated with the current session, and that said computer program code means are arranged so that the cookie proxy is informed to continue storing cookies associated with the current session or delete cookies bound to the previous session by an indication in a message, which message if received with said indication informs the cookie proxy to continue the storing of cookies associated with the current session, and which message if received without said indication informs the cookie proxy to delete session-bound cookies of the previous session.

* * * * *